United States Patent
Kato et al.

(10) Patent No.: US 7,216,966 B2
(45) Date of Patent: May 15, 2007

(54) WATER BASE INK SET FOR INK-JET RECORDING

(75) Inventors: Ryuji Kato, Aichi-ken (JP); Masashi Tsuda, Aichi-ken (JP); Noriaki Satoh, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 175 days.

(21) Appl. No.: 10/744,553

(22) Filed: Dec. 22, 2003

(65) Prior Publication Data

US 2005/0001889 A1 Jan. 6, 2005

(30) Foreign Application Priority Data

Dec. 24, 2002 (JP) .............................. 2002-372785

(51) Int. Cl.
*G01D 11/00* (2006.01)
(52) U.S. Cl. ...................... 347/100; 347/95; 523/160
(58) Field of Classification Search ................ 347/100, 347/95, 96, 101; 106/31.6, 31.27, 31.13; 523/160
See application file for complete search history.

(56) References Cited

U.S. PATENT DOCUMENTS 4,500,693 A * 2/1985 Takehara et al. ............. 526/240

2004/0168608 A1 * 9/2004 Bauer et al. ................. 347/100

FOREIGN PATENT DOCUMENTS

JP 7-314880 12/1999

* cited by examiner

Primary Examiner—Manish S. Shah
(74) *Attorney, Agent, or Firm*—Reed Smith LLP

(57) ABSTRACT

A water base ink set for ink-jet recording includes a water base ink which contains an acid dye, and a water base ink which contains a basic dye. The water base ink contains a polymer which has an average molecular weight of 3,000 to 20,000 and which is represented by the following formula (1):

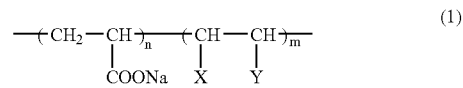

wherein X represents H or COONa, and Y represents H, COONa, $SO_3Na$, or $CH_2OR$ in the formula (1). R represents a substituted group having $SO_3Na$ with carbon atom or atoms of a number of 1 to 5. When the ink containing the acid dye and the ink containing the basic dye are mixed with each other, then the head discharge section is prevented from any clog-up, and it is possible to perform the stable jetting operation.

8 Claims, No Drawings

WATER BASE INK SET FOR INK-JET RECORDING

BACKGROUND OF THE INVENTION

1. Field of the Invention

The present invention relates to a water base ink set for ink-jet recording to be used for an ink-jet recording apparatus.

2. Description of the Related Art

In the ink-jet recording system, ink droplets are formed, for example, by means of the electrostatic attraction system, the system in which mechanical vibration or displacement is applied to the ink by using a piezoelectric element, and the system in which bubbles are generated by heating the ink to utilize the pressure generated thereby. All or a part of the ink droplets are adhered to a recording objective material such as paper to perform the recording.

The ink-jet recording system is advantageous in that the high printing or typing quality and the high print or photographic quality are obtained by controlling the discharge of the minute liquid droplets. Colors approximate to those obtained by the full color system can be reproduced and images without involving any granular texture can be formed by allowing the minute ink droplets of several picoliters to land highly accurately on the paper surface. However, in order to make it possible to discharge the minute liquid droplets as described above, it is necessary to establish a highly accurate landing control technique while using the sufficiently thin discharge nozzle. In order to highly accurately discharge the ink from the discharge nozzles having minute diameters as described above, it is necessary to remove the dust and impurities from the ink. Therefore, it is necessary that the precise filtration or microfiltration is performed for the ink for ink-jet recording, and materials, which are sufficiently washed, are used for all parts which make contact with the ink.

Most of general full color ink-jet printers, which are based on the use of an ink set of four colors of black, yellow, magenta, and cyan, use water base inks containing acid dyes in view of the toxicity and the coloring performance on the paper. However, the vividness is insufficient in some cases depending on the color. It is demanded to obtain a vivid image like those depicted with marker pens. Such a demand is especially great for the yellow. In order to satisfy the demand as described above, it is preferable that a basic dye, which develops a vivid color, is used as actually used for the marker pen. However, if water base inks, which contain basic dyes, are used for the water base inks of all colors to be used for the full color ink-jet printer, a resultant ink set is hardly considered to be appropriate in view of the color balance, even though the respective single colors are vivid.

On the other hand, Japanese Patent Application Laid-open No. 7-314880, which relates to an ink-jet recording material having an ink-receiving layer provided on a support, describes a method in which a basic dye is contained in the ink-receiving layer, and an ink for ink-jet recording containing an acid dye having a hue or tone different from that of the basic dye is used to perform the recording, and a method in which an acid dye is contained in the ink-receiving layer, and an ink for ink-jet recording containing a basic dye having a hue or tone different from that of the acid dye is used to perform the recording. However, in the methods as described above, it is necessary to use the ink-jet recording material which is allowed to contain the dye. Further, the inks of all colors are unbalanced to the use of the acid dyes or the basic dyes. The methods as described above are hardly considered to be appropriate in view of the color balance as well.

Therefore, when it is intended to obtain a vivid image having good color balance, it is preferable to use a water base ink containing an acid dye and a water base ink containing a basic dye in combination. However, in such a case, it is feared that the water base ink containing the acid dye and the water base ink containing the basic dye are mixed with each other at a head discharge section of an ink-jet printer to produce any deposit. The degree of the production of the deposit differs depending on, for example, the type of the dye, the concentration of the dye, the type of the solvent, and the concentration of the solvent. However, when the deposit is produced, then the clog-up arises at the head discharge section in some cases, and it is impossible to highly accurately control the discharge and the landing in other cases.

The acid dye and the basic dye are dissociated into cations and anions in the aqueous solution. It is considered that the deposit is produced as follows when the both dye solutions are mixed with each other. That is, the anion contained in the acid dye and the cation contained in the basic dye are attracted to one another, and the fundamental moieties of the dyes are bonded to one another. Therefore, if the anion contained in the acid dye and the cation contained in the basic dye are prevented from being attracted to one another, it is possible to avoid the production of the deposit. However, in general, the anion and the cation tend to effect the attraction. Therefore, it is difficult to avoid the production of the deposit when the both inks are mixed with each other.

SUMMARY OF THE INVENTION

The present invention has been made in order to solve the problem as described above, an object of which is to provide a water base ink set for ink-jet recording which makes it possible to perform the stable jetting operation and perform the recording highly reliably and highly accurately without causing any clog-up at a head discharge section which would be otherwise caused by the deposition, even when a water base ink containing an acid dye and a water base ink containing a basic dye are mixed with each other.

According to the present invention, there is provided a water base ink set for ink-jet recording comprising:
a water base ink which contains an acid dye; and
a water base ink which contains a basic dye, wherein:
at least one of the water base ink which contains the acid dye and the water base ink which contains the basic dye contains a polymer which is represented by the following formula (1) and which has an average molecular weight of 3,000 to 20,000:

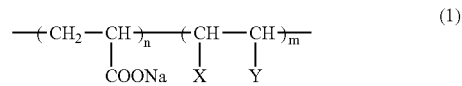

wherein m:n=7 to 5:3 to 5 is satisfied, X represents H or COONa, and Y represents COONa, SO$_3$Na, or CH$_2$OR in the formula (1) provided that R represents a group having carbon atom or atoms of a number of 1 to 5 and SO$_3$Na.

According to the present invention, there is provided an ink cartridge comprising the ink set of the present invention. The ink cartridge may have, for example, chambers for accommodating the inks of respective colors. The ink cartridge may be a cartridge to which a head of an ink-jet printer is installed, or a cartridge which is installed to a main body, for example, a case of an ink-jet printer.

DESCRIPTION OF THE PREFERRED EMBODIMENTS

The water base ink set for ink-jet recording according to the present invention comprises at least the water base ink containing the acid dye and the water base ink containing the basic dye. The acid dye is not specifically limited, including, for example, C. I. Direct Yellow 8, 11, 12, 27, 28, 33, 39, 44, 50, 58, 85, 86, 87, 88, 89, 98, 100, 110, 132; C. I. Acid Yellow 1, 3, 7, 11, 17, 23, 25, 29, 36, 38, 40, 42, 44, 76, 98, 99; C. I. Reactive Yellow 2, 3, 17, 25, 37, 42; C. I. Food Yellow 3; C. I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230; C. I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289; C. I. Reactive Red 7, 12, 13, 15, 17, 20, 23, 24, 31, 42, 45, 46, 59; C. I. Food Red 87, 92, 94; C. I. Direct Blue 1, 15, 22, 25, 41, 76, 77, 80, 86, 90, 98, 106, 108, 120, 158, 163, 168, 199, 226; C. I. Acid Blue 1, 7, 9, 15, 22, 23, 25, 29, 40, 43, 59, 62, 74, 78, 80, 90, 100, 102, 104, 117, 127, 138, 158, 161; C. I. Reactive Blue 4, 5, 7, 13, 14, 15, 18, 19, 21, 26, 27, 29, 32, 38, 40, 44, 100; C. I. Direct Black 17, 19, 22, 31, 32, 51, 62, 71, 74, 112, 113, 154, 168, 195; C. I. Acid Black 2, 48, 51, 52, 110, 115, 156; and C. I. Food Black 1, 2. Each of the acid dyes as described above may be used singly. Alternatively, two or more of the dyes as described above may be used in a mixed manner.

The content of the acid dye in the water base ink containing the acid dye is preferably 0.1 to 20% by weight and more preferably 0.5 to 10% by weight.

The basic dye is not specifically limited, including, for example, C. I. Basic Yellow 1, 2, 11, 13, 14, 19, 21, 25, 32, 33, 36, 51; C. I. Basic Orange 2, 15, 21, 22; C. I. Basic Red 1, 2, 9, 12, 13, 37, 38, 39, 92; C. I. Basic Violet 1, 3, 7, 10, 14; C. I. Basic Blue 1, 3, 5, 7, 9, 19, 24, 25, 26, 28, 29, 45, 54, 65; C. I. Basic Green 1, 4; C. I. Basic Brown 1, 12; and C. I. Basic Black 2, 8. Each of the basic dyes as described above may be used singly. Alternatively, two or more of the dyes as described above may be used in a mixed manner.

The content of the basic dye in the water base ink containing the basic dye is preferably 0.1 to 10% by weight and more preferably 0.2 to 3% by weight.

In the water base ink set for ink-jet recording according to the present invention, the water base ink containing the acid dye and/or the water base ink containing the basic dye contains the compound (polymer) represented by the formula (1).

When the water base ink set for ink-jet recording of the present invention is composed of a plurality of the water base inks containing the acid dyes and/or a plurality of the water base inks containing the basic dyes, all of the water base inks containing the acid dyes and/or all of the water base inks containing the basic dyes contain the compound represented by the formula (1). That is, when an arbitrary water base ink containing the acid dye and/or an arbitrary water base ink containing the basic dye included in the water base ink set for ink-jet recording is selected, the compound represented by the formula (1) is contained in any one of or both of the inks.

The compound represented by the formula (1) may be exemplified, for example, by acrylic acid/maleic acid copolymer and acrylic acid/sulfonic acid copolymer. Each of the copolymers can be obtained by copolymerizing acrylic acid and maleic acid or sulfonic acid under a predetermined condition.

In the formula (1), m and n are not zero. The ratio therebetween satisfies m:n=7 to 5: 3 to 5 because of the large effect of steric hindrance to inhibit the deposition of the acid dye and the basic dye, because maleic acid and sulfonic acid are more bulky than acrylic acid. In the formula (1), X represents H or COONa. Y represents COONa, $SO_3Na$, or $CH_2OR$. R represents a group having carbon atom or atoms of a number of 1 to 5 and $SO_3Na$, for example, $CH_2OCH_2CH(OH)CH_2SO_3Na$. In particular, when X is H, it is preferable that Y is $SO_3Na$ or $CH_2OCH_2CH(OH)CH_2SO_3Na$. When X is COONa, it is preferable that Y is COONa as well.

It is preferable that the compound represented by the formula (1) has a value of 1,000 to 200,000 when the average molecular weight is measured by means of the gel permeation chromatography (GPC). The term "average molecular weight" herein refers to the weight average molecular weight. If the average molecular weight is less than 1,000, the steric hindrance effect of the compound represented by the formula (1) is considerably deteriorated. Therefore, it is considered that the production of the deposit cannot be avoided when the acid dye and the basic dye are mixed with each other. On the other hand, if the average molecular weight exceeds 200,000, then the structure is too huge, and it is impossible to effect the electric attraction with respect to the basic dye. It is considered that the production of the deposit cannot be avoided. For the reason as described above, the average molecular weight is preferably 3,000 to 100,000 and especially preferably 5,000 to 15,000. The molecular weight is adjusted by selecting the monomer and the polymerization condition.

It is preferable that the content of the compound represented by the formula (1) is 0.03 to 5% by weight with respect to the total amount of the ink. If the content is less than 0.03% by weight, then the effect to avoid the deposition is deteriorated when the water base ink containing the acid dye and the water base ink containing the basic dye are mixed with each other, and the discharge failure of the ink occurs in some cases. If the content exceeds 5% by weight, the viscosity, which is obtained after the evaporation of water from the ink, is extremely raised in some cases. Therefore, if the ink is dried at the head discharge section, the discharge failure of the ink sometimes occurs. More preferably, the content is 0.05 to 2% by weight.

The water base ink containing the acid dye and the water base ink containing the basic dye contain water. The water is preferably deionized water (pure water). It is preferable that the content of water is not less than 40% by weight with respect to the total amount of the ink in order that that the viscosity of the ink in the ordinary state is maintained to be a low viscosity at which the jetting operation can be normally performed.

It is preferable that each of the water base ink containing the acid dye and the water base ink containing the basic dye contains a moistening agent and a permeating agent.

The moistening agent is added principally in order to avoid the drying up and the production of the deposit from the ink at the tip of the ink-jet head. The moistening agent is usable for the water base ink containing the acid dye and the water base ink containing the basic dye.

The moistening agent may include, for example, polyalkylene glycols; alkylene glycols such as ethylene glycol, diethylene glycol, triethylene glycol, propylene glycol, butylene glycol, dipropylene glycol, tripropylene glycol, polyethylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The moistening agents as described above may be also used in a mixed manner.

It is preferable that the content of the moistening agent is 5 to 50% by weight with respect to the total amount of the ink. If the content is less than 5% by weight, then the moistening function is insufficient, and problems including, for example, drying up and deposition occur. On the other hand, if the content exceeds 50% by weight, the viscosity of the ink is unnecessarily increased. As a result, for example, the following problems arise. That is, the discharge operation cannot be performed in some cases, and the ink is dried extremely slowly on the recording paper in other cases. More preferably, the content is 10 to 40% by weight.

It is preferable that polyvalent alcohol monoalkyl ether, which has low odor and low vapor pressure, is used for the permeating agent. Those which improve the quick drying property of the ink on the paper surface by effectively quickening the permeation velocity of the ink into the recording paper, which avoid the bleeding (blurring at the boundary between different colors) resulting from the slow drying property on the recording paper, and which hardly cause the feathering (whisker-shaped blurring along the paper fiber) resulting from the permeation are preferably used as the polyvalent alcohol monoalkyl ether. The polyvalent alcohol monoalkyl ether may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether. In order to control the permeation and the drying performance of the ink on the recording paper, it is also possible to use monovalent alcohol such as ethanol and isopropyl alcohol.

It is preferable that the content of the permeating agent is 0.2 to 20% by weight with respect to the total amount of the ink. If the content is less than 0.2% by weight, the permeation velocity of the ink into the recording paper is slow. As a result, problems arise in relation to the drying time and the blurring. If the content exceeds 20% by weight, the permeation of the ink into the recording paper is intensified. The ink arrives at the back of the recording paper in some cases. Further, a problem also arises in relation to the blurring. More preferably, the content is 0.5 to 10% by weight.

The water base ink set for ink-jet recording of the present invention is basically constructed as described above. Other than the above, if necessary, it is possible to add, for example, conventionally known various resin binders, surfactants, viscosity-adjusting agents, surface tension-adjusting agents, pH-adjusting agents, dye-dissolving agents, and antiseptic/fungicidal agents.

When the water base ink set for ink-jet recording of the present invention is applied to the ink-jet recording system in which the ink is discharged in accordance with the action of thermal energy, thermal physical values including, for example, the specific heat, the coefficient of thermal expansion, and the coefficient of thermal conductivity may be adjusted.

The problems involved in the conventional technique are sufficiently dissolved in the water base ink set for ink-jet recording of the present invention. Even when the water base ink containing the acid dye and the water base ink containing the basic dye are mixed with each other, the deposit is not produced, probably for the following reason. That is, it is considered that the substituted group of the compound represented by the formula (1) is changed to give $COO^-$ and $SO_3^-$ in accordance with the ionization to effect the attraction with respect to the cation of the basic dye, and thus the contact is prohibited between the cation of the basic dye and the anion of the acid dye. Further, it is considered that the contact with the acid dye can be made more difficult by means of the steric hindrance of the compound represented by the formula (1) attracted by the basic dye depending on the molecular weight of the compound represented by the formula (1).

EXAMPLES

An explanation will be made below about Examples in which the present invention is embodied and Comparative Examples. Examples and Comparative Examples described below are illustrative of a case of a full color printer based on the use of inks of four colors. However, there is no limitation thereto. Those based on five or more colors or three or less colors are also available.

Example 1

Production of Acrylic Acid/Sulfonic Acid Copolymer 100 g of water was added to a flask equipped with a thermometer and a Dimroth condenser, followed by being heated to a reflux temperature under the normal pressure. 54 g (0.3 mole) of an aqueous solution of 40% acrylic acid and 9 g of an aqueous solution of 37% sodium hydrogensulphite were added dropwise separately over 2 hours respectively. Simultaneously with the start of the dropwise addition of the aqueous solutions, a solution of 40% sodium vinylpropanesulfonate and an aqueous solution of 20% sodium persulfate were started to be added dropwise separately to the aqueous solution contained in the flask respectively. As for the solution of 40% sodium vinylpropanesulfonate, 228 g (0.7 mole) was added dropwise over 100 minutes. As for the aqueous solution of 20% sodium persulfate, 25 g was added dropwise over 3 hours. Thus, the copolymerization reaction was performed in the flask. After the completion of the dropwise addition, the agitation was continued for further 1 hour to complete the copolymerization reaction. Thus, an objective copolymer was obtained.

The molecular weight of the obtained copolymer was measured by the gel permeation chromatography. As a result, the average molecular weight was about 6,000. Acrylic acid and sodium vinylpropanesulfonate, which were unreacted, were measured by the polarography to calculate the reacted monomers. As a result, it was confirmed that the polymerization was performed at a ratio of 3:7 as approximately exactly charged. An aqueous solution of acrylic acid/sulfonic acid copolymer thus obtained (X=H, Y=$SO_3Na$, n:m=3:7 in the formula (1)) was used to prepare an ink set as described below.

Preparation of Ink Set

The water base ink set for ink-jet recording was prepared with compositions shown in Tables 1 to 4 for respective inks of black ink, yellow ink, magenta ink, and cyan ink.

TABLE 1

| Black ink composition | % by weight |
|---|---|
| C. I. Food Black 2 | 1.0 |
| Polyethylene glycol | 20.0 |
| Triethylene glycol monobutyl ether | 5.0 |
| 2-Pyrrolidone | 5.0 |
| 50% aqueous solution of acrylic acid/sulfonic acid copolymer, X = H and Y = SO$_3$Na in formula (1) (average molecular weight: about 6,000) | 0.3 |
| Pure water | 68.7 |

TABLE 2

| Yellow ink composition | % by weight |
|---|---|
| C. I. Basic Yellow 40 | 0.8 |
| Polyethylene glycol | 20.0 |
| 2-Pyrrolidone | 5.0 |
| Diethylene glycol monobutyl ether | 5.0 |
| Pure water | 69.2 |

TABLE 3

| Magenta ink composition | % by weight |
|---|---|
| C. I. Acid Red 52 | 1.0 |
| Polyethylene glycol | 20.0 |
| 2-Pyrrolidone | 5.0 |
| Triethylene glycol monobutyl ether | 5.0 |
| 50% aqueous solution of acrylic acid/sulfonic acid copolymer, X = H and Y = SO$_3$Na in formula (1) (average molecular weight: about 6,000) | 0.3 |
| Pure water | 68.7 |

TABLE 4

| Cyan ink composition | % by weight |
|---|---|
| C. I. Basic Blue 3 | 0.8 |
| Glycerol | 25.0 |
| Triethylene glycol monobutyl ether | 6.0 |
| Pure water | 68.2 |

Example 2

Production of Acrylic Acid/Sulfonic Acid Copolymer 150 g of water was added to a flask equipped with a thermometer and a Dimroth condenser, followed by being heated to a reflux temperature under the normal pressure. 90 g (0.5 mole) of an aqueous solution of 40% acrylic acid and 15 g of an aqueous solution of 37% sodium hydrogensulphite were added dropwise separately over 2 hours respectively. Simultaneously with the start of the dropwise addition of the aqueous solutions, a solution of 40% sodium 3-allyloxy-2-hydroxy-1-propanesulfonate and 20 g of an aqueous solution of 20% sodium persulfate were added dropwise separately to the aqueous solution contained in the flask respectively. As for the solution of 40% sodium 3-allyloxy-2-hydroxy-1-propanesulfonate, 110 g (0.5 mole) was added dropwise over 100 minutes. As for the aqueous solution of 20% sodium persulfate, 20 g was added dropwise over 3 hours. Thus, the copolymerization reaction was performed in the flask. After the completion of the dropwise addition, the agitation was continued for further 1 hour to complete the copolymerization reaction. Thus, an objective copolymer was obtained.

The molecular weight of the obtained copolymer was measured by means of the same method as that used in Example 1. As a result, the average molecular weight was about 5,000. Acrylic acid and sodium 3-allyloxy-2-hydroxy-1-propanesulfonate, which were unreacted, were measured by means of the polarography to calculate the reacted monomers. As a result, it was confirmed that the polymerization was performed at a ratio of 1:1 as approximately exactly charged. An aqueous solution of acrylic acid/sulfonic acid copolymer thus obtained (X=H, Y=CH$_2$OCH$_2$CH(OH)CH$_2$SO$_3$Na, n:m=1:1 in the formula (1)) was used to prepare an ink set as described below.

Preparation of Ink Set

The water base ink set for ink-jet recording was prepared in the same manner as in Example 1 except that the yellow ink composition and the cyan ink composition used in Example 1 were changed to compositions shown in Tables 5 and 6.

TABLE 5

| Yellow ink composition | % by weight |
|---|---|
| C. I. Basic Yellow 40 | 0.8 |
| Polyethylene glycol | 20.0 |
| 2-Pyrrolidone | 5.0 |
| Diethylene glycol monobutyl ether | 5.0 |
| 30% aqueous solution of acrylic acid/sulfonic acid copolymer, X = H and Y = CH$_2$OCH$_2$CH(OH)CH$_2$SO$_3$Na in formula (1) (average molecular weight: about 5,000) | 0.3 |
| Pure water | 68.9 |

TABLE 6

| Cyan ink composition | % by weight |
|---|---|
| C. I. Basic Blue 3 | 0.8 |
| Glycerol | 25.0 |
| Triethylene glycol monobutyl ether | 6.0 |
| 30% aqueous solution of acrylic acid/sulfonic acid copolymer, X = H and Y = CH$_2$OCH$_2$CH(OH)CH$_2$SO$_3$Na in formula (1) (average molecular weight: about 5,000) | 0.2 |
| Pure water | 68.0 |

Example 3

Production of Acrylic Acid/Maleic Acid Copolymer 58.8 g (0.6 mole) of maleic anhydride, 200 g of water, 48 g (1.2 moles) of sodium hydroxide were charged in a flask equipped with a thermometer and a Dimroth condenser. Maleic anhydride was neutralized while performing agitation to prepare an aqueous solution of 30% disodium maleate. After that, the heating was performed to a reflux temperature under the normal pressure. Subsequently, 72 g (0.4 mole) of an aqueous solution of 40% acrylic acid, 50 g of an aqueous solution of 10% ammonium persulfate as an polymerization initiator, and 50 g of an aqueous solution of 14% hydrogen peroxide were gradually added dropwise separately over 4 hours respectively to perform the copolymerization reaction. After the completion of the dropwise addition, the agitation was continued for further 1 hour to complete the copolymerization reaction. After that, the neutralization was performed with 28 g (0.35 mole) of an aqueous solution of 49% sodium hydroxide to obtain an objective substance.

The molecular weight of the obtained copolymer was measured by means of the same method as that used in Example 1. As a result, the average molecular weight was about 15,000. Acrylic acid and maleic acid, which were unreacted, were measured by means of the polarography to calculate the reacted monomers. As a result, it was confirmed that the polymerization was performed at a ratio of 4:6 as approximately exactly charged. An aqueous solution of acrylic acid/maleic acid copolymer thus obtained (X=Y=COONa, n:m=4:6 in the formula (1)) was used to prepare an ink set as described below.

Preparation of Ink Set

The water base ink set for ink-jet recording was prepared with compositions shown in Tables 7 to 10 for respective inks of black ink, yellow ink, magenta ink, and cyan ink.

TABLE 7

| Black ink composition | % by weight |
|---|---|
| C. I. Food Black 2 | 0.8 |
| Glycerol | 25.0 |
| 2-Pyrrolidone | 5.0 |
| Diethylene glycol monoisobutyl ether | 5.0 |
| 36% aqueous solution of acrylic acid/maleic acid copolymer, X = Y = COONa in formula (1) (average molecular weight: about 15,000) | 0.4 |
| Pure water | 63.8 |

TABLE 8

| Yellow ink composition | % by weight |
|---|---|
| C. I. Basic Yellow 19 | 0.5 |
| Polyethylene glycol | 20.0 |
| 2-Pyrrolidone | 5.0 |
| Diethylene glycol monoisobutyl ether | 5.0 |
| Pure water | 69.5 |

TABLE 9

| Magenta ink composition | % by weight |
|---|---|
| C. I. Basic Red 1 | 0.5 |
| Polyethylene glycol | 20.0 |
| 2-Pyrrolidone | 5.0 |
| Triethylene glycol monobutyl ether | 5.0 |
| Pure water | 69.5 |

TABLE 10

| Cyan ink composition | % by weight |
|---|---|
| C. I. Basic Blue 9 | 1.0 |
| Polyethylene glycol | 20.0 |
| 2-Pyrrolidone | 5.0 |

TABLE 10-continued

| Cyan ink composition | % by weight |
|---|---|
| Triethylene glycol monobutyl ether | 5.0 |
| Pure water | 69.0 |

Example 4

A water base ink set for ink-jet recording was prepared in the same manner as in Example 3 except that the composition was changed to a composition shown in Table 11 and the acrylic acid/sulfonic acid copolymer prepared in Example 2 was used in place of the acrylic acid/maleic acid copolymer for the black ink of Example 3.

TABLE 11

| Black ink composition | % by weight |
|---|---|
| C. I. Food Black 2 | 0.8 |
| Glycerol | 25.0 |
| 2-Pyrrolidone | 5.0 |
| Diethylene glycol monoisobutyl ether | 5.0 |
| 30% aqueous solution of acrylic acid/sulfonic acid copolymer, X = H and Y = $CH_2OCH_2CH(OH)CH_2SO_3Na$ in formula (1) (average molecular weight: about 5,000) | 0.3 |
| Pure water | 63.9 |

Example 5

A water base ink set for ink-jet recording was prepared in the same manner as in Example 3 except that the yellow ink composition, the magenta ink composition, and the cyan ink composition used in Example 3 were changed to compositions shown in Tables 12 to 14. Further, the acrylic acid/sulfonic acid copolymer prepared in Example 2 was used as the acrylic acid/sulfonic acid copolymer.

TABLE 12

| Yellow ink composition | % by weight |
|---|---|
| C. I. Basic Yellow 19 | 0.5 |
| Polyethylene glycol | 20.0 |
| 2-Pyrrolidone | 5.0 |
| Diethylene glycol monoisobutyl ether | 5.0 |
| 30% aqueous solution of acrylic acid/sulfonic acid copolymer, X = H and Y = $CH_2OCH_2CH(OH)CH_2SO_3Na$ in formula (1) (average molecular weight: about 5,000) | 0.3 |
| Pure water | 69.2 |

TABLE 13

| Magenta ink composition | % by weight |
|---|---|
| C. I. Basic Red 1 | 0.5 |
| Polyethylene glycol | 20.0 |
| 2-Pyrrolidone | 5.0 |
| Triethylene glycol monobutyl ether | 5.0 |
| 30% aqueous solution of acrylic acid/sulfonic acid copolymer, X = H and Y = $CH_2OCH_2CH(OH)CH_2SO_3Na$ in formula (1) (average molecular weight: about 5,000) | 0.3 |
| Pure water | 69.2 |

TABLE 14

| Cyan ink composition | % by weight |
|---|---|
| C. I. Basic Blue 9 | 1.0 |
| Polyethylene glycol | 20.0 |
| 2-Pyrrolidone | 5.0 |
| Triethylene glycol monobutyl ether | 5.0 |
| 30% aqueous solution of acrylic acid/sulfonic acid copolymer, X = H and Y = CH$_2$OCH$_2$CH(OH)CH$_2$SO$_3$Na in formula (1) (average molecular weight: about 5,000) | 0.3 |
| Pure water | 68.7 |

Comparative Examples are shown below.

Comparative Example 1

A water base ink set for ink-jet recording was prepared in the same manner as in Example 1 except that the black ink composition and the magenta ink composition used in Example 1 were changed to compositions shown in Tables 15 and 16. Therefore, the water base ink set for ink-jet recording of Comparative Example 1 was obtained by excluding the compound represented by the formula (1) from the water base ink set for ink-jet recording of Example 1.

TABLE 15

| Black ink composition | % by weight |
|---|---|
| C. I. Food Black 2 | 1.0 |
| Polyethylene glycol | 20.0 |
| Triethylene glycol monobutyl ether | 5.0 |
| 2-Pyrrolidone | 5.0 |
| Pure water | 69.0 |

TABLE 16

| Magenta ink composition | % by weight |
|---|---|
| C. I. Acid Red 52 | 1.0 |
| Polyethylene glycol | 20.0 |
| 2-Pyrrolidone | 5.0 |
| Triethylene glycol monobutyl ether | 5.0 |
| Pure water | 69.0 |

Comparative Example 2

A water base ink set for ink-jet recording was prepared in the same manner as in Example 3 except that the black ink composition used in Example 3 was changed to a composition shown in Table 17. Therefore, the water base ink set for ink-jet recording of Comparative Example 2 was obtained by excluding the compound represented by the formula (1) from the water base ink set for ink-jet recording of Example 3.

TABLE 17

| Black ink composition | % by weight |
|---|---|
| C. I. Food Black 2 | 0.8 |
| Glycerol | 25.0 |
| 2-Pyrrolidone | 5.0 |

TABLE 17-continued

| Black ink composition | % by weight |
|---|---|
| Diethylene glycol monoisobutyl ether | 5.0 |
| Pure water | 64.2 |

The jetting operation test and the microscopic observation for the head discharge section were performed in accordance with the following methods for the water base ink sets for ink-jet recording of Examples 1 to 5 and Comparative Examples 1 and 2 after filtrating the ink sets through a membrane filter of 0.2 µm.

(1) Jetting Operation Test

An on-demand type multi-head (discharge orifice diameter: 40 µm, driving voltage: 30 V, frequency: 10 kHz), in which liquid droplets were generated by applying the pressure brought about by the vibration of a piezoelectric element to the ink contained in a recording head to perform the recording, was used to perform the jetting operation while simultaneously using the four colors. The jetting operation was performed until the inks contained in cartridges were exhausted. When the discharge failure and/or the curvature was observed when the jetting operation was performed, then the purge operation was performed, and the restored situation was observed.

The following evaluation criteria were adopted. +: Neither discharge failure nor curvature appeared at all to the end of the jetting operation. ±: The discharge failure and the curvature were slightly observed in the jetting operation, but the restoration was successful when the purge operation was performed. −: The discharge failure and the curvature were observed in the jetting operation, and the restoration was unsuccessful when the purge operation was performed. Results of the jetting operation test are shown in Table 18.

TABLE 18

|  | Jetting operation test |
|---|---|
| Example 1 | + |
| Example 2 | + |
| Example 3 | + |
| Example 4 | ± |
| Example 5 | + |
| Comp. Ex. 1 | − |
| Comp. Ex. 2 | − |

(2) Microscopic Observation of Head Discharge Section

After the jetting operation was performed as described above, the head discharge section was microscopically observed. The following results were obtained in the microscopic observation. That is, any foreign matter (deposit) was confirmed at each of the head discharge sections of only the printers each of which was not restored by means of the purge operation. No foreign matter was confirmed at each of the head discharge sections other than the above.

As described above, when the water base ink sets for ink-jet recording of Examples 1 to 5 were used, no deposit appeared even when the acid dye ink and the basic dye ink were mixed with each other. Therefore, no clog-up was caused by the deposit at the head discharge section.

The present invention is constructed as described above. Therefore, the jetting operation can be performed stably without causing any clog-up at the head discharge section which would be otherwise caused by the deposition, even when the water base ink containing the acid dye and the water base ink containing the acid dye are mixed with each other. It is possible to provide the water base ink set for ink-jet recording which makes it possible to perform the recording highly reliably and highly accurately.

What is claimed is:

1. A water base ink set for ink-jet recording comprising:
a water base ink which contains an acid dye; and
a water base ink which contains a basic dye, wherein:
at least one of the water base ink which contains the acid dye and the water base ink which contains the basic dye contains a polymer which is represented by the following formula (1) and which has an average molecular weight of 3,000 to 20,000:

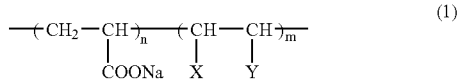

wherein m:n=7 to 5:3 to 5 is satisfied, X represents H, and Y represents $SO_3Na$.

2. The ink set according to claim 1, wherein the polymer has a weight average molecular weight of 5,000 to 15,000.

3. The ink set according to claim 1, wherein each of the water base ink which contains the acid dye and the water base ink which contains the basic dye contains the polymer.

4. An ink cartridge comprising the ink set as defined in claim 1.

5. A water base ink set for ink-jet recording comprising:
a water base ink which contains an acid dye; and
a water base ink which contains a basic dye, wherein:
at least one of the water base ink which contains the acid and the water base ink which contains the basic dye contains a polymer which is represented by the following formula (1) and which has an average molecular of 3,000 to 20,000:

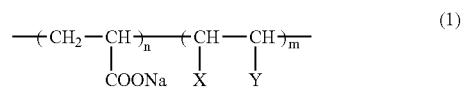

wherein m:n=7 to 5:3 to 5 is satisfied, X represents COONa, and Y represents COONa.

6. The ink set according to claim 5, wherein the polymer has a weight average molecular weight of 5,000 to 15,000.

7. The ink set according to claim 5, wherein each of the water base ink which contains the acid dye and the water base ink which contains the basic dye contains the polymer.

8. An ink cartridge comprising the ink set as defined in claim 5.

* * * * *